US008461989B2

(12) United States Patent
Romero et al.

(10) Patent No.: US 8,461,989 B2
(45) Date of Patent: Jun. 11, 2013

(54) SMART CONTAINER UWB SENSOR SYSTEM FOR SITUATIONAL AWARENESS OF INTRUSION ALARMS

(75) Inventors: Carlos E. Romero, Livermore, CA (US); Peter C. Haugen, Livermore, CA (US); James M. Zumstein, Livermore, CA (US); Richard R. Leach, Jr., Castro Valley, CA (US); Mark L. Vigars, Livermore, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 746 days.

(21) Appl. No.: 12/580,379

(22) Filed: Oct. 16, 2009

(65) Prior Publication Data

US 2010/0141443 A1    Jun. 10, 2010

Related U.S. Application Data

(60) Provisional application No. 61/106,102, filed on Oct. 16, 2008.

(51) Int. Cl.
*G08B 21/00* (2006.01)

(52) U.S. Cl.
USPC .......... 340/541; 340/426.1; 340/426.24; 340/552; 342/27; 342/28

(58) Field of Classification Search
USPC .......... 340/539.1, 539.22–539.27, 541–567, 340/426.1, 426.24, 426.25, 431; 342/27, 342/28
See application file for complete search history.

(56) References Cited

U.S. PATENT DOCUMENTS

| | | | |
|---|---|---|---|
| 5,276,427 A | 1/1994 | Peterson | |
| 5,519,400 A | 5/1996 | McEwan | |
| 5,883,591 A | 3/1999 | McEwan | |
| 6,208,248 B1 | 3/2001 | Ross | |
| 6,710,736 B2 | 3/2004 | Fullerton et al. | |
| 2006/0106546 A1 | 5/2006 | Roberts et al. | |
| 2008/0211668 A1 | 9/2008 | Dixon et al. | |
| 2009/0115607 A1* | 5/2009 | Beinhocker | 340/541 |

FOREIGN PATENT DOCUMENTS
WO    WO2004005088 A1    1/2004

OTHER PUBLICATIONS

Venkatasubramnian, "A Novel Chaos-Based UWB Sensor for Enhancing Homeland Security", Proceedings of SPIE vol. 5778, pp. 972-980 (2005).
Schiavone, et al., "Intruder Detection and Tracking Using UWB Technology", Proceeding of SPIE vol. 5431, pp. 106-116 (2004).

* cited by examiner

*Primary Examiner* — Jeffery Hofsass
(74) *Attorney, Agent, or Firm* — John P. Wooldridge

(57) ABSTRACT

An in-container monitoring sensor system is based on an UWB radar intrusion detector positioned in a container and having a range gate set to the farthest wall of the container from the detector. Multipath reflections within the container make every point on or in the container appear to be at the range gate, allowing intrusion detection anywhere in the container. The system also includes other sensors to provide false alarm discrimination, and may include other sensors to monitor other parameters, e.g. radiation. The sensor system also includes a control subsystem for controlling system operation. Communications and information extraction capability may also be included. A method of detecting intrusion into a container uses UWB radar, and may also include false alarm discrimination. A secure container has an UWB based monitoring system.

27 Claims, 9 Drawing Sheets

SMART CONTAINER UWB SENSOR SYSTEM FOR SITUATIONAL AWARENESS OF INTRUSION ALARMS

This application claims the benefit of U.S. Provisional Application No. 61/106,102 filed Oct. 16, 2008.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to intrusion detection, and more particularly to intrusion detection based on ultrawideband (UWB) radar, and most particularly to intrusion detection based on UWB radar for shipping containers.

2. Description of Related Art

At a time of significant terrorist threats, the international shipping system is particularly vulnerable. It is highly desirable to improve the security of containerized cargo as it moves around the world. A goal is an improved cargo shipping container instrumented with security sensing and tracking capabilities. Any such technical capabilities implemented in the international container shipping system should maintain open borders and facilitate commerce while improving security practices by using point-of-origin security, in-transit tracking and monitoring and data query capability designed to validate and facilitate the movement of containerized cargo.

The development of a sensing and tracking system to optimize the safety of the cargo container supply chain is part of an effort by the U.S. and other countries, at various levels, and industry, to find technical solutions to enhance and secure both international and inter-modal supply chains. The effort will help to integrate the dissemination of all relevant cargo container information to the various Homeland Security components of the nations and their political subdivisions, as well as to those private sector businesses with day-to-day responsibility for tracking and transporting secure and protected cargo. Of course, the highest priority in improving cargo security is to protect against the introduction of a nuclear device or special nuclear materials into the U.S. or other countries. The development of a cargo container supply chain security system has a number of significant objectives. The system would ideally include a comprehensive sensor package (including at least intrusion sensing and radiation sensing) that can withstand environmental conditions on standard shipping routes. A near-real-time readout of container condition en-route on a secure website is desirable. It should provide a measurement of the radiation environment (as well as other environmental parameters) for the duration of standard shipping routes. A container intrusion sensor based on Ultra Wide Band (UWB) Radar technology should be included.

These components and features can be implemented in an autonomous in-container monitoring sensor system integrated with communications and information extraction equipment that is capable of continuously recording all sensor data, and detecting anomalies during transport of shipping containers. A secure web site to which sensor information can be posted for real-time viewing by designated authorities may also be part of the system. Such a system can provide timely warning of tampering to Customs and law-enforcement officials.

It is desirable that a cargo container supply chain security system (i) measures, records, and establishes environmental ground truth for future cargo monitoring system development and research, (ii) monitors the efficacy of sensors deployed to provide tampering and intrusion detection alerts and (iii) measures survivability of such systems in the complex, often harsh environments shipping containers encounter.

Wherever possible, sensors for the monitoring system should be selected to meet various criteria. The components should be commercially available. A system that is easy to operate and can be scaled cost-effectively to a large system is desirable. It is beneficial if the system enables efficient data reduction and exfiltration of information, is ruggedizable for long-life, detects and stores position, time, and sensor data while en-route, includes a Global Positioning System and is non-intrusive (will not affect normal shipping operations). Coverage of North American and Europe and extendability to other areas is desired.

A particular problem associated with the monitoring of shipping containers in transit is the possibility of false alarms. Shipping containers are subject to a lot of movement during loading, unloading, and during transit in ships and on trucks. In addition, cargo shifting inside of the container along with Radio Frequency (RF) interference must be accommodated. An effective cargo monitoring system needs to be able to discriminate against these false alarms.

One type of motion sensor applicable to this problem is based on ultrawideband (UWB) radar, as exemplified by U.S. Pat. No. 5,361,070, incorporated herein by reference. UWB radar range is determined by a pulse-echo interval. For motion detection, the sensors operate by looking at a fixed range and then sensing any change in the averaged radar reflectivity at that range. A sampling gate is opened at a fixed delay after the emission of a transmit pulse. The resultant sampling gate output is averaged over repeated pulses. Changes in the averaged sampling gate output represent changes in the radar reflectivity at a particular range, and thus motion. UWB motion sensors have many advantages over infrared and acoustic motion sensors, particularly in a container filled with cargo and applications where long operational lifetimes on a single battery is needed.

Accordingly it is desirable to provide an improved intrusion detection system for shipping containers. It is also desirable to provide an in-container sensor system with communications and information extraction capabilities. It is further desirable to provide a system based on UWB radar, and a system which discriminates against false alarms.

BRIEF SUMMARY OF THE INVENTION

An aspect of the invention is an intrusion detection apparatus for detecting intrusion into a cargo shipping container, including an ultrawideband (UWB) radar intrusion sensor; at least one other motion or intrusion sensor; and a control system connected to the UWB radar intrusion sensor and to the at least one other motion or intrusion sensor for determining therefrom the occurrence of an intrusion into a cargo shipping container in which the intrusion detection apparatus is mounted. A further aspect of the invention is an intrusion detection apparatus for detecting intrusion into a cargo shipping container, including an ultrawideband (UWB) radar intrusion sensor, and a control system connected to the UWB radar intrusion sensor to perform signal processing to discriminate against false alarm occurrences. Optionally, the system may contain one or more discrimination sensors, such as gross motion sensors, gyros, or accelerometers to assist with discrimination of shipping container movement from actual container intrusion.

Another aspect of the invention is a cargo shipping container sensing and tracking system adapted for mounting in a cargo shipping container, including a plurality of sensors, one sensor being an ultrawideband (UWB) radar intrusion detector; at least one control module, the plurality of sensors being connected thereto; a central control unit connected to the at least one control module for determining from the plurality of sensors the occurrence of an intrusion into a container; and a power module connected to the at least one control module.

Also an aspect of the invention is a method for detecting intrusion into a cargo shipping container by placing an ultrawideband (UWB) radar intrusion detector having a fixed range gate inside a cargo shipping container, the fixed range gate of the UWB radar intrusion detector being substantially equal to the distance from the UWB radar intrusion detector to the farthest point of the container from the UWB radar intrusion detector; and operating the UWB radar intrusion detector; whereby because of multipath reflections any point on the container is at, or within, the fixed range gate and an intrusion at any point is detected.

A further aspect of the invention is an instrumented container for shipping cargo, including a cargo shipping container made of or coated with metal or other radar reflective material; and an ultrawideband (UWB) radar intrusion detector having a fixed range gate inside the cargo shipping container, the fixed range gate of the UWB radar intrusion detector being substantially equal to or greater than the distance from the UWB radar intrusion detector to the farthest point of the container from the UWB radar intrusion detector.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus and flowcharts generally shown in FIG. 1 through FIG. 10B. It will be appreciated that the apparatus may vary as to configuration and as to details of the parts, and that the methods may vary as to the specific steps and sequence, without departing from the basic concepts as disclosed herein.

The invention is an autonomous in-container monitoring sensor system integrated with communications and information extraction equipment that is capable of continuously recording all sensor data, processing and combining the data from the various sensors in an intelligent and efficient manner, and detecting anomalies during transport of shipping containers. The sensor system includes an UWB radar intrusion detector. The sensor system also includes other sensors to assist with false alarm discrimination, and may include other sensors to monitor other parameters, e.g., radiation. The sensor system also includes a control subsystem for controlling the operation of the system. The invention also includes methods of detecting intrusion into a container from any of the 6 sides, using UWB radar, and such methods further providing false alarm discrimination. The invention also includes a secure container with the UWB based monitoring system. The sensor system may also be based only on the UWB detector. A secure web site to which sensor information can be posted for real-time viewing by designated authorities may also be part of the system.

System Architecture

Figure 1:
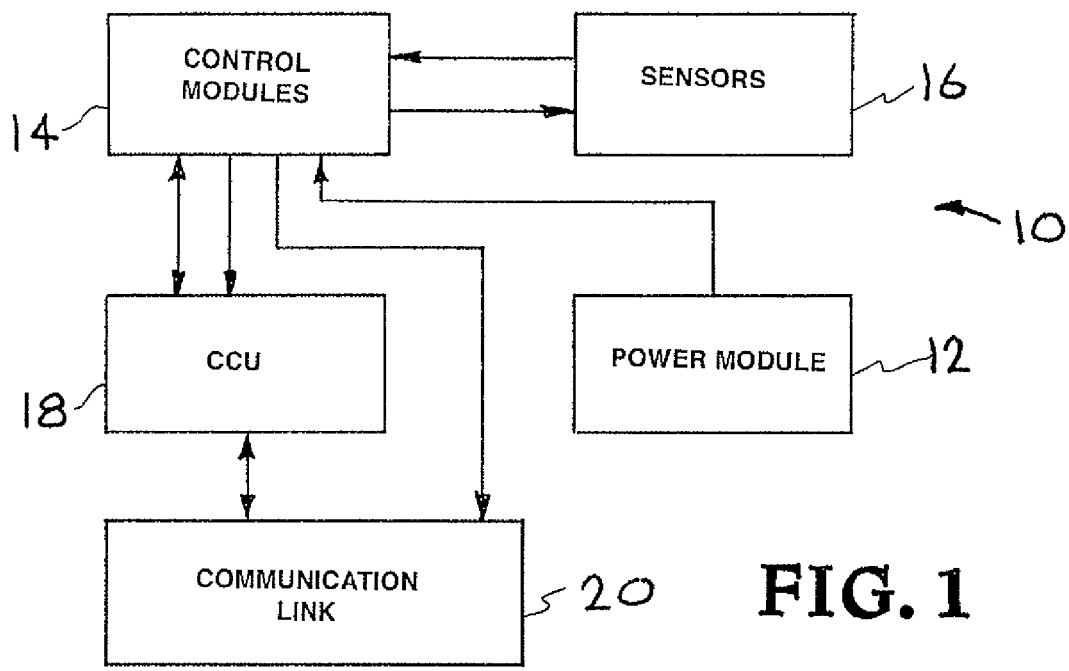
FIG. 1 is a system architecture block diagram of a cargo security or sensing and tracking system of the invention.

A security or sensing and tracking system 10 of the invention, as shown in FIG. 1, is divided into five hardware components or subsystems: a power module 12, control modules 14, sensors 16, a central control unit 18, and a communication link 20. Power module 12 regulates the energy from a battery pack to the control modules 14. The control modules 14 distribute the power to the sensors 16, the central control unit 18 and the communication link 20. The control modules 14 handle the handshaking between the incoming sensor data from sensors 16 and the central control unit 18, which is preferably a laptop computer. The central control unit 18 keeps a port open looking for incoming sensor data from the control modules 14. Upon detection this sensor data is recorded in a storage device, e.g., on a disk. Additionally, the central control unit 18 initiates dialing procedures to the communications link 20. This opens a transmission channel to the outside world in order to pass the encrypted data and permit on-the-fly remote program downloads.

Sensors

In an illustrative embodiment, a total of fifteen (15) sensors are deployed per operational system, as listed in Table 1. In this example system the sensors fall into two general categories; sensors that return a time series of data, and sensors that return a single point measurement (e.g., 98% relative humidity). In the time series category of sensors, most are event driven sensors. These include a UWB intrusion sensor, an optical intrusion sensor, a magnetic intrusion sensor, and three (x, y, and z axis) accelerometers. Once a detection confidence threshold is exceeded for any of the event driven sensors, data is recorded from every event driven sensor. In this fashion, for example, if the UWB intrusion sensor exceeds the detection threshold, data will be captured for all of the other event driven sensors, even though these are all below threshold. The only time series sensor that is not event driven is the radiation sensor. This sophisticated sensor is used as a scheduled environmental sensor with data being collected for 240 sec every 40 minutes.

TABLE 1

Sensor List

| | | |
|---|---|---|
| X-Axis Accelerometer | Event Driven Sensors | Time Series |
| Y-Axis Accelerometer | | |
| Z-Axis Accelerometer | | |
| UWB Intrusion Sensor | | |

TABLE 1-continued

Sensor List

| | | |
|---|---|---|
| Optical Intrusion Sensor | | |
| Magnetic Intrusion Sensor | | |
| Radiation Spectroscopy and Neutron Sensor | Scheduled Environmental Sensor | |
| Battery Humidity | Scheduled Environmental Sensor | Single Point Measurement |
| System Humidity | | |
| Remote Humidity | | |
| Battery Temperature | | |
| System Temperature | | |
| Remote Temperature | | |
| Battery Current | Scheduled System Health Sensor | |
| Battery Voltage | | |

The single point measurement sensors are not used to trigger any events. They fall into two subcategories, environmental monitoring sensors and system health sensors. As the name implies, the environmental sensors are used to characterize the humidity and the temperature of the surroundings from three different locations on the system (battery, system, and remote). These sensors are mounted on acquisition modules and as such effectively monitor the humidity and temperature at these points. The system health sensors (battery current and battery voltage) provide an indication of the amount of power being drawn and the voltage remaining on the battery pack maintaining the system.

All but two of the sensors are low cost, easily available commercial off the shelf sensors. The two exceptions are the UWB intrusion sensor and the radiation sensor, which in an illustrative embodiment is a 1024 channel radiation spectroscopy and neutron sensor.

The specific ultrawideband (UWB) intrusion sensor employed is a subclass of the micro-power impulse radar (MIR) family commonly known as a homodyne radar. In particular it is called a Guardian Radar Sensor (GRS). The GRS is a range gated radar sensor that can be set at any specific range up to a maximum of approximately 100 ft in radius with the appropriate antenna. Classically, this sensor is coupled with an omni-directional antenna, which creates a perimeter hemi-sphere or bubble around the sensor with a nominal wall thickness of 2 ft. Objects moving anywhere in this 2 ft wall zone will generate a change in the radar reflections received by the sensor and trigger an alarm. Objects moving either within or outside the bubble will not trigger the device. The sensor draws 2 mA average and will run on a pair of lithium AA batteries for a year at a time.

Figure 2:
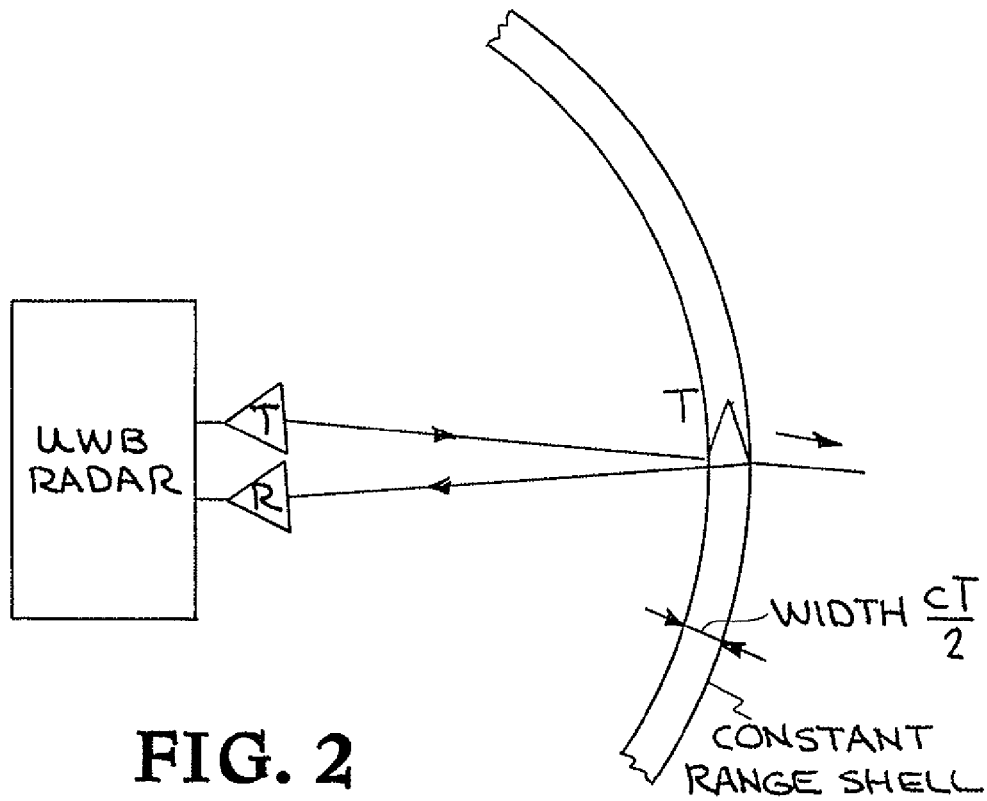
FIG. 2 illustrates an UWB radar constant range shell.

An UWB pulse-echo system 22 typically operates at a constant sampling delay, or at a constant range, as depicted in FIG. 2. Due to the short impulse emitted, an effective spherical shell 23 is projected in space. The thickness of the shell is directly related to the sampling pulse width, which is generally set to be equal to the transmit pulse width T. The constant range shell then has a thickness of cT/2 where c is the pulse velocity. A fixed range UWB MIR motion sensor is described in U.S. Pat. No. 5,361,070, which is herein incorporated by reference.

Low power homodyne UWB radar (MIR) sensors are described in U.S. Pat. Nos. 6,414,627; 5,682,164; 5,512,834; 5,521,600; 5,519,400, which are herein incorporated by reference. In a homodyne UWB radar sensor, an intermediate frequency (IF) is produced. This IF frequency can be sampled by the system control electronics and used to discriminate human motion from RF interference and cargo container movement.

For the security system of the invention, the UWB radar sensor is ideally suited to detect any intrusion into a cargo container. This can be accomplished by using a directional or omni-directional antenna and setting the range gate of the sensor equal to or greater than the distance to the farthest wall. The UWB sensor can be placed anywhere in the container, e.g., on the back wall. In a closed cargo container (where the container is made of or coated with metal or other radar reflective material), there are many multi-paths due to reflections off the wall structures with very low signal loss. This means that a correctly gated radar path length from an intrusion can be constructed from any point on or within the container even if there is only one time gate, i.e. fixed range gate.

Figure 3:
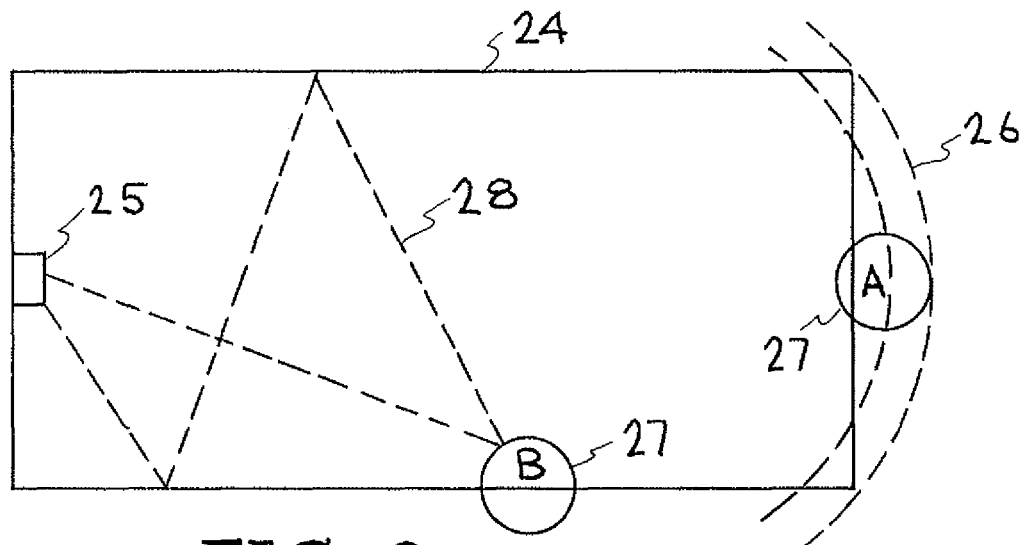
FIG. 3 illustrates an UWB radar intrusion detector in a container.

FIG. 3 illustrates the operation of an UWB radar intrusion detector (motion sensor) 25 inside a container 24. The range gate 26 of UWB motion sensor 25 is set substantially at (or slightly beyond) the farthest wall, which in this case is the front wall. When an intruder 27 enters at the far wall, at point "A", he passes through range gate 26 and is detected. However, when intruder 27 enters at a point "B" which is much closer to detector 25 than point "A" and would appear to be inside the range gate 26, there is still a path 28, from detector 25 to intruder 27 at point "B" and back to detector 25, that is the same round trip distance from detector 25 as range gate 26. Thus intruder 27 entering at point "B" effectively enters the range gate 26 and is detected. Thus, placing an UWB radar detector 25 in a radar reflective container 24 and setting the range gate 26 to the farthest wall of container 24 from detector 25 makes every point on the container at the range gate 26.

This mode of operation is unlike when the UWB sensor is used in a semi open to open environment, where there are no detections inside or outside the gated range. For example, if a GRS is mounted at the back of a 40 ft cargo container and the range gate is set to 40 ft, then the sensor will trigger an alarm when the door opens and the radar path length will have been 80 ft (roundtrip). On the other hand, if the door remains closed, and there is entry from a side closer than 40 ft from the back or movement inside the container, an 80 ft path length will form with enough energy left over to trigger the sensor. As a consequence, intrusion into the cargo container by any means, from any point, will be detected. Likewise any movement inside the container can be detected, even in the presence of a highly cluttered or loaded container with the sensor's view obstructed.

In a prototype embodiment, and to gain as detailed as possible background radiation measurements, a Nucsafe Inc. Guardian Portable Radiation Search Tool (PRST) serves as the radiation sensor. The system is a Guardian PRST 40022 upgraded for gamma spectroscopy. The soft pack case was selected which determined the configuration to consist of a 400 cm2 PUMA class fiber neutron panel and a 2"×2" NaI detector. The detector records for 240 sec every 40 minutes and dumps the spectrum for storage on the laptop. In general, a radiation detector may be included as an additional sensor so that information that nuclear material is present may be quickly determined when an intrusion is detected.

Control Modules

The control modules 14 play a central role in the system design by interacting with every other component. Each module has the same four roles: power regulation and distribution, sensor monitoring, data acquisition, and data transfer to central storage on the central control unit 18.

Different component power requirements dictate diverse regulated power supplies. In an illustrative embodiment, the power regulation and distribution functionality of the control modules provide taps for 4.6V, 5V and 12V. In addition, relays controlled by an on-board microprocessor provide switched power to adaptively, and as needed, power cycle various nonresponding components. The microprocessor serves as the controlling element on the module both for sensor monitoring and data acquisition. It controls the monitoring of the event driven sensors, the sampling interval of the single point sensors, and the integrity of the sensor data, and provides a serial stream of output data. As part of the data transfer role, the microprocessor interfaces with the central storage on the central control unit 18 to upload sensor data, as requested, as a converted USB stream. The control modules 14 also house the temperature and humidity sensors.

Figure 4:
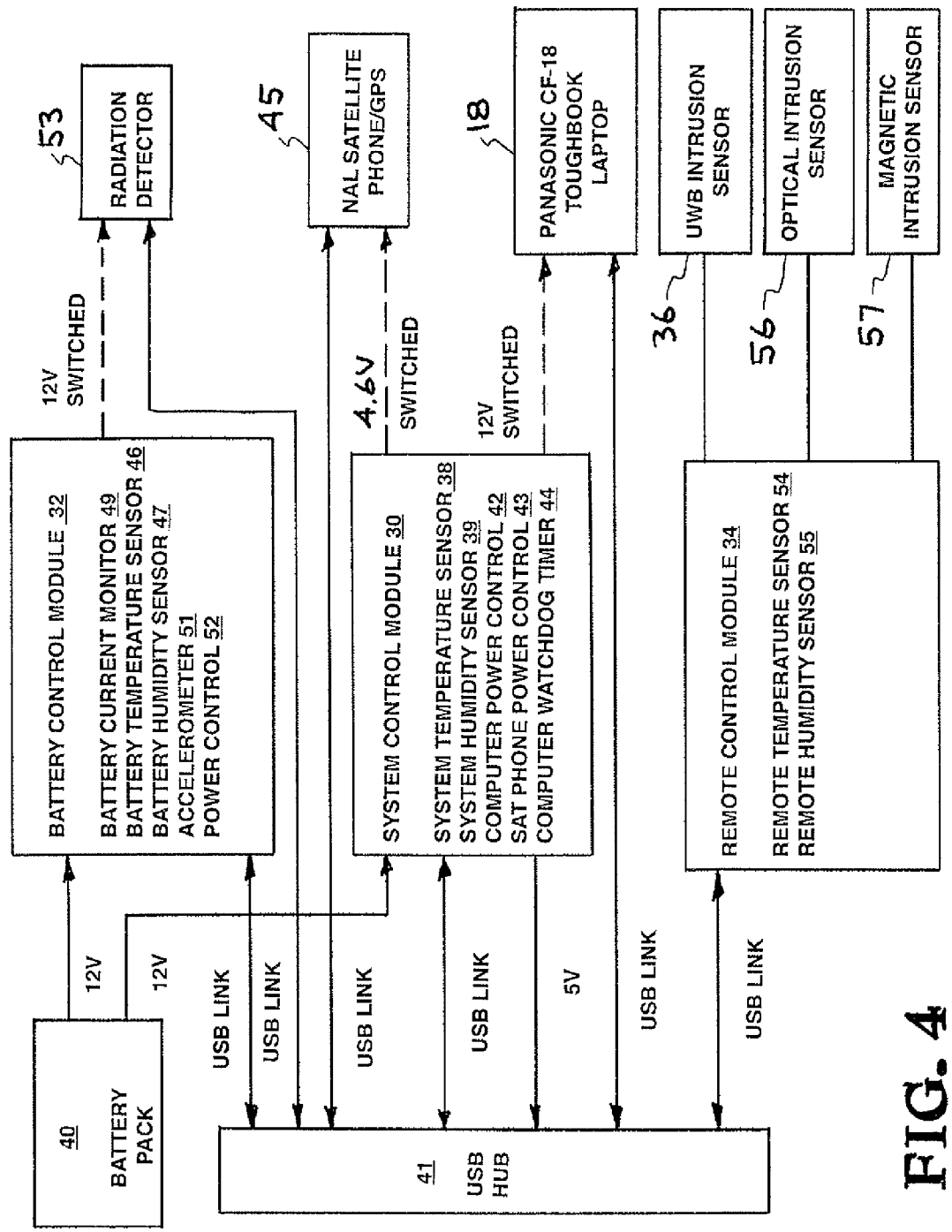
FIG. 4 is a detailed system block diagram of the control modules.

In an illustrative embodiment, shown in FIG. 4, control modules 14 was three separate modules: system control module 30, battery control module 32, and remote control module 34. Of course, the components of control modules 14 could be arranged in one or more modules. The system control module 30 was collocated with the battery control module 32 while the remote control module 34 was housed with the UWB intrusion sensor 36.

The system control module 30 housed the system temperature and humidity sensors 38, 39. Additionally it received 12V power from battery pack 40 and provided 5V to the USB Hub 41, 12V to the case fans (not shown), 4.6V switched power from satellite phone power controller 43 to the Iridium type satellite phone/GPS 45, and 12V switched power from computer power control 42 to the central control unit 18, a Panasonic CF18 Toughbook laptop computer. The onboard microprocessor maintained a watchdog timer 44 to power cycle the computer 18 in the event of a lock-up.

The battery control module 32 housed the battery temperature and humidity sensors 46, 47. Additionally it monitored the battery voltage, battery current and 3-axis accelerometers through battery voltage and current monitors 49, 50 and accelerometer monitor 51. By providing a switched power supply from radiation detector power control 52 to the radiation detector 53 (NUCSAFE Guardian PRST), it facilitated power cycling of the detector in order to conserve battery life.

The remote control module 34 housed the remote temperature and humidity sensors 54, 55. Additionally it monitored the UWB intrusion sensor 36, the ground truth optical intrusion sensor 56 and the ground truth magnetic intrusion sensor 57. All the modules and sensors are connected to USB Hub 41 by USB links.

Central Control Unit/Laptop

Central to the operation of the systems was central control unit 18, a Panasonic CF18 Toughbook Laptop. The laptop played a data collection role and a communications role. The first role was executed by the central storage software (see below), the second by the client side software (see below). Despite the MIL-SPEC of the unit, it was shock mounted and protected inside the Pelican brand case that housed the system and battery control modules 30, 32.

Communications Link

The system was originally designed to maintain communication with the outside world through a NAL Research Corporation Iridium Satellite Modem with GPS communications module (Model A3LA-DGP). However, due to design flaws in the NAL unit, the GPS and the satellite components could not be operated simultaneously. For a first trial run a NAL unit was used as a GPS and a Motorola handheld Iridium Modem unit (Model 9505) as the satellite component. For a second trial run, the NAL units were used as the satellite components and a Pharos Pocket GPS locator was used for GPS. Communication with the satellite hardware and GPS were through a series of AT and extended AT commands down a serial/USB link. The communications architecture is explained in more detailed below.

Power Module

A power module 12 (FIG. 1) including battery pack 40 (FIG. 4) ensured redundant and fail-proof delivery of power to the different components. Battery packs individually provided leads to a fusible link bus on the power module. In this system they were arranged in parallel and distributed power to the sensors 16, control modules 14, central control unit/laptop 18 and communications link 20.

Data Collection

Data collection depends on a complicated interaction between control software on the central control unit/laptop 18, control software on the control modules 14, and sensor data.

Central Storage Software (CSS)

Figure 5:
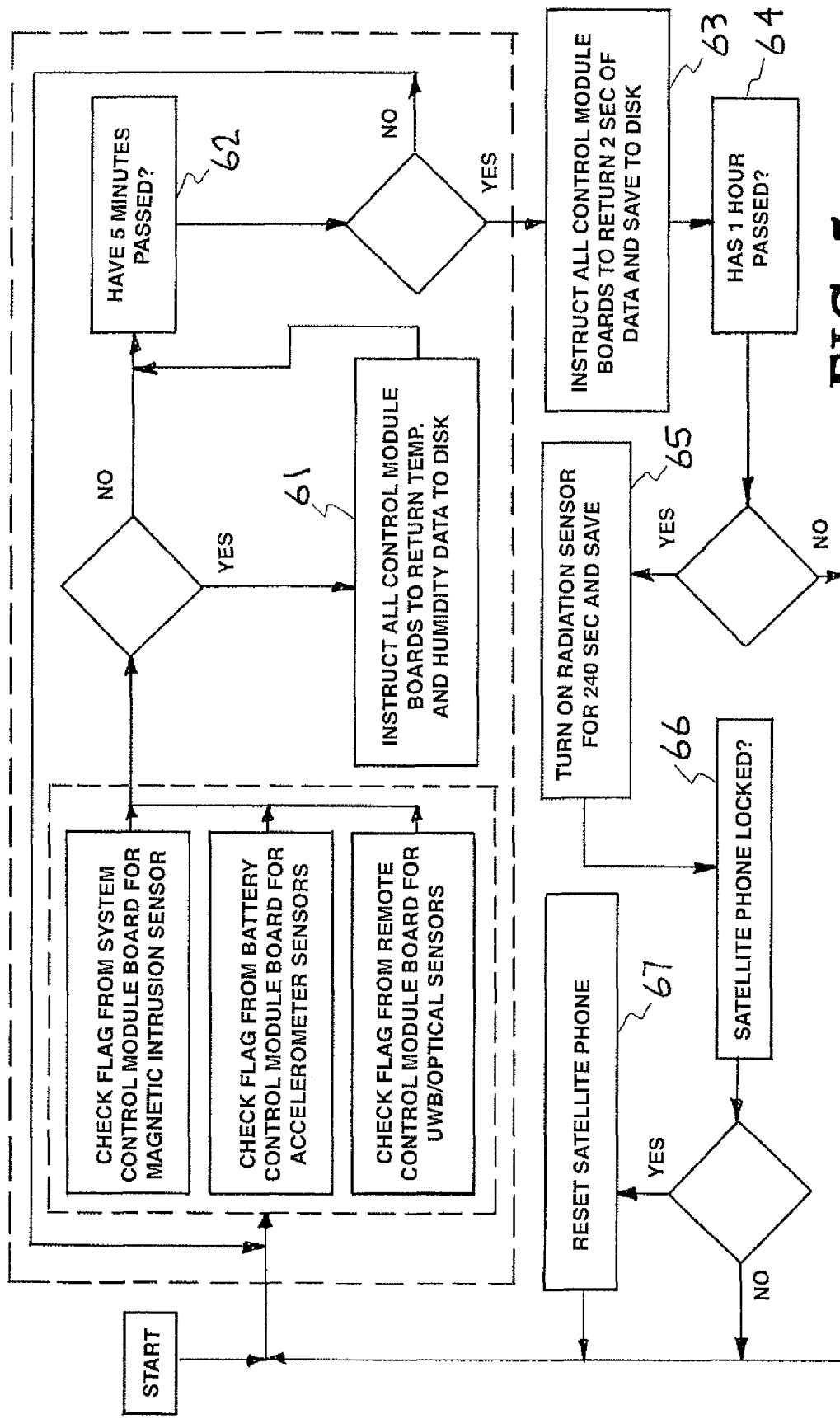
FIG. 5 is a central storage software flowchart.

The central storage software (CSS) provides the main control loop for the data acquisition. Other than data storage, there are four main functions as shown in the flowchart of FIG. 5.

The CSS checks to see if a FLAG has been set by any of the control modules for an event driven sensor (accelerometer, UWB intrusion, optical intrusion, and magnetic intrusion), step 60. If so, all the control modules are instructed to return 2 sec of data for storage, step 61. Whether or not a FLAG has been set, the CSS then checks if five minutes has passed, step 62. If five minutes has not elapsed, the CSS returns to check FLAGs again (repeat step 60).

At a preset interval, in this case every five minutes, the CSS sends a command to the control modules to retrieve the temperature and humidity data, step 63. The CSS then checks if one hour has passed, step 64. If one hour has not elapsed, the CSS returns to check FLAGs again (repeat step 60).

At a preset interval, in this case every hour, the CSS sends a command to the battery control module to turn on and read the radiation sensor for 240 seconds, step 65.

At a preset interval, in this case every hour, the CSS also checks the status of the satellite phone, step 66, and if locked issues a command to the system control module to power cycle the satellite phone, step 67. The CSS then returns to step 60.

Control Module Software (CMS)

Figure 6:
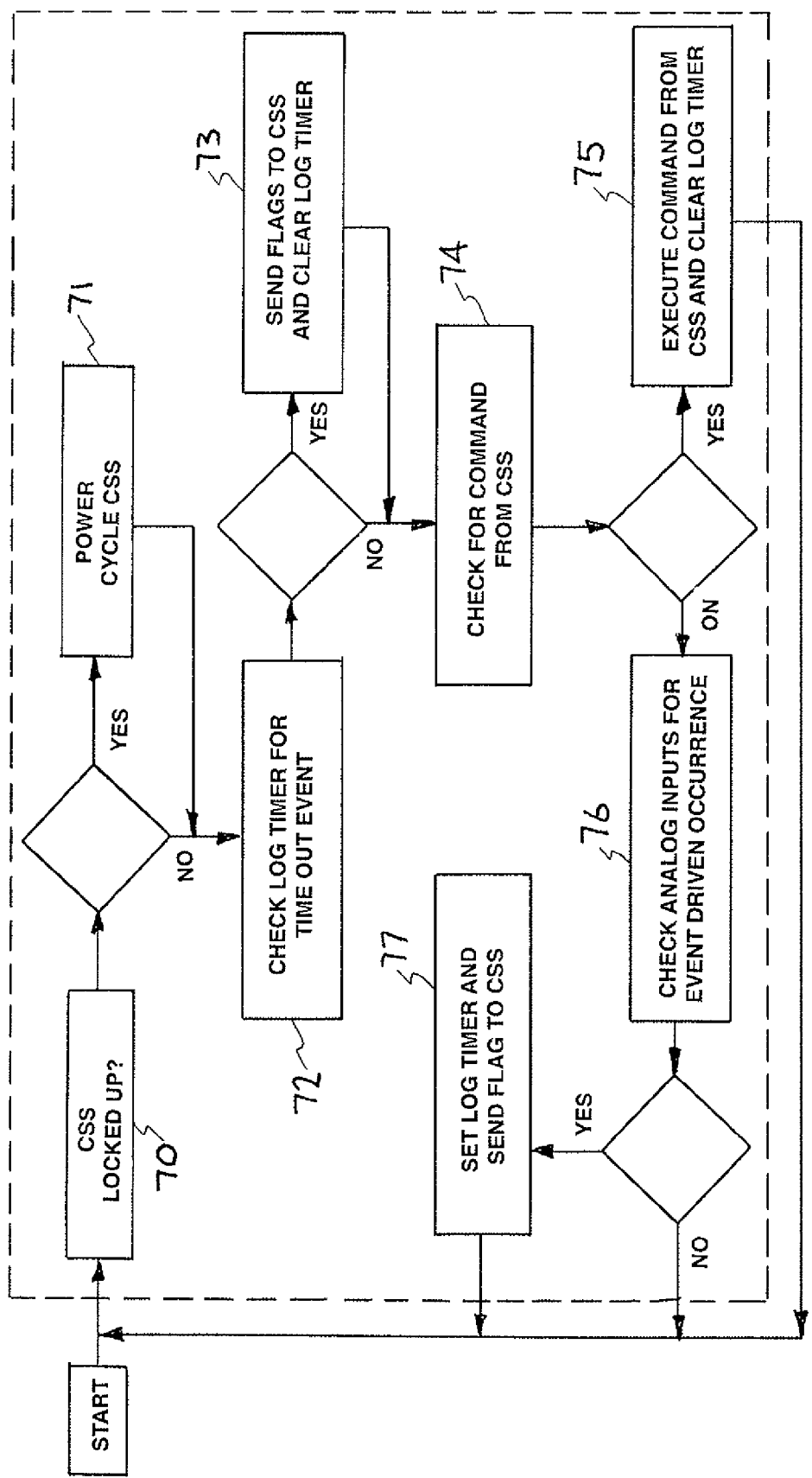
FIG. 6 is a control module software flowchart.

The control module software (CMS) has three main functions as shown in the flowchart of FIG. 6. The CMS checks to see if the central storage software (CSS) is locked up, step 70. If so it power cycles the CSS, step 71. If the CSS is not locked up, or if it is and is power cycled, then the CMS checks the LOG timer for time out events, step 72. If the LOG timer shows a time out event, the CMS sends a FLAG to the CSS and clears the LOG timer, step 73. After step 73, or if the LOG timer does not show a time out event in step 72, the CMS checks for a command from the CSS, step 74. If there is a command in step 74, the CMS executes the command and clears the LOG timer, step 75, and returns to step 70. If there is no command in step 74, the CMS checks the analog inputs from the sensors for event driven occurrences, step 76.

If the CMS detects an occurrence on an event driven sensor in step 76, it informs the CSS, by setting the LOG timer and sending a FLAG to the CSS, step 77. Then if there is no event occurrence in step 76 or after step 77, the CMS returns to step 70.

Not shown in the flow chart, the CMS also executes power cycle commands, sensor query commands, and data forwarding commands as directed by the CSS.

Communications

Figure 7:
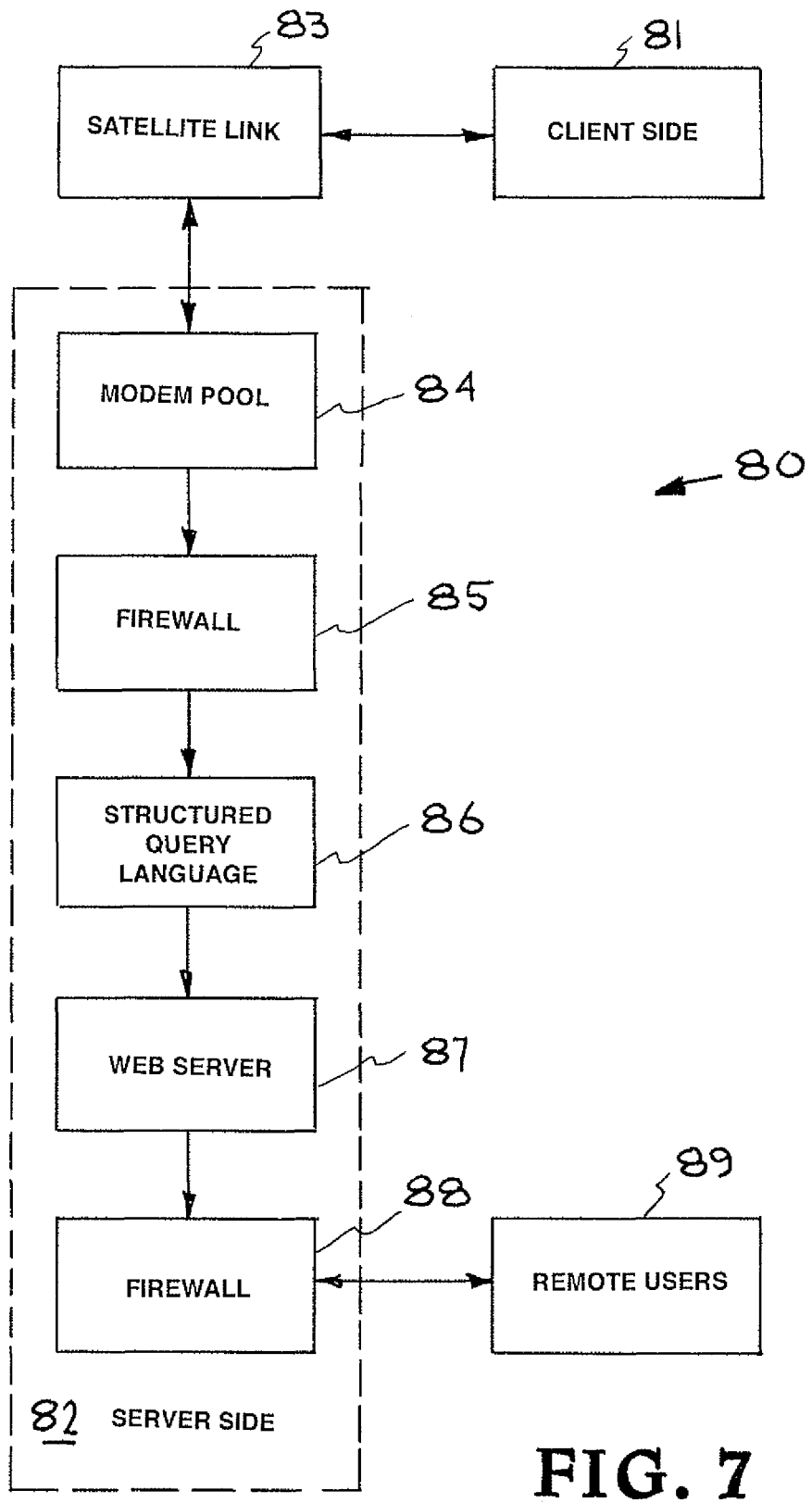
FIG. 7 is a communications architecture block diagram.

The communications architecture follows a client/server configuration with associated software and hardware. As shown in FIG. 7, communications architecture 80 includes a client side 81, in the shipping container, and a server side 82, at some remote location. Data stored locally on the cargo containers is processed locally by client software in the client side 81 and uploaded via the satellite link 83 and to the server side 82. Server side 82 includes modem pool 84, firewall 85, Structured Query Language (SQL) server 86, web server 87, and firewall 88 in series. Once on the remote server side 82, the data is parsed by the SQL server 86 and fed to web server 87. Access to the data on web server 88 by remote users 89 is possible from the internet through a secure web site. Secure Sockets Layer (SSL) password authentication provides read access, RSA one time passwords (OTP) provide read and write access. The design was made as flexible as possible taking into account the uncertainty in data rates and satellite drop-out zones across the regions of travel. Very low rate remote programming protocols were also added to modify the client side software from the server side.

Client Side Software

Figure 8:
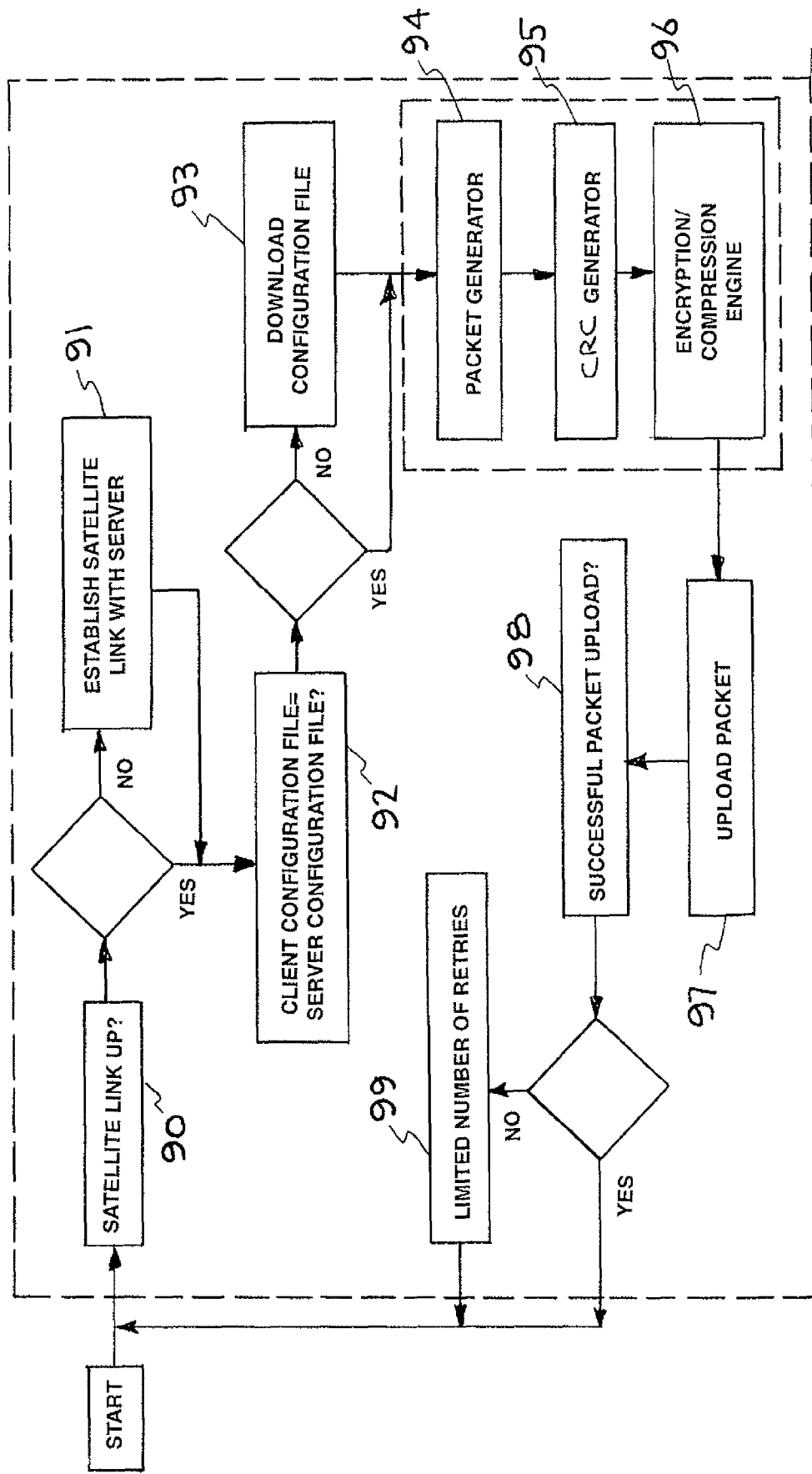
FIG. 8 is a client side software flowchart.

The central control unit (Panasonic Toughbook) hosts the client software shown in FIG. 8. Upon initialization, the client software checks if the satellite link is up, step 90, and if not, establishes a satellite link to the server software, step 91. A client configuration file sets the data rate, the packet size of the sensor data of interest, the fields in the sensor data to upload, and the sensor data line of interest. For this last item, the sensor data line of interest, there are two options. Based on the last successful data line transmitted, the next data line could be transmitted; or the latest data line in the file could be pulled. The software then checks if the client configuration file is the same as the server configuration file, step 92. If the resident (client) configuration file differs from that on the server, the server version of the configuration file is downloaded onto the Panasonic Toughbook, step 93. Based on the configuration file, the Packet Generating function packetizes the data, step 94. The packet is then passed through a CRC Generator, step 95, and an Encryption/Compression Engine, step 96, before being uploaded or handed over to the satellite phone, step 97. A handshake with the server confirms successful transmission of the packet, step 98. After successful transmission, or a limited number of retries, step 99, the software returns to step 90.

Server Side Software

Figure 9:
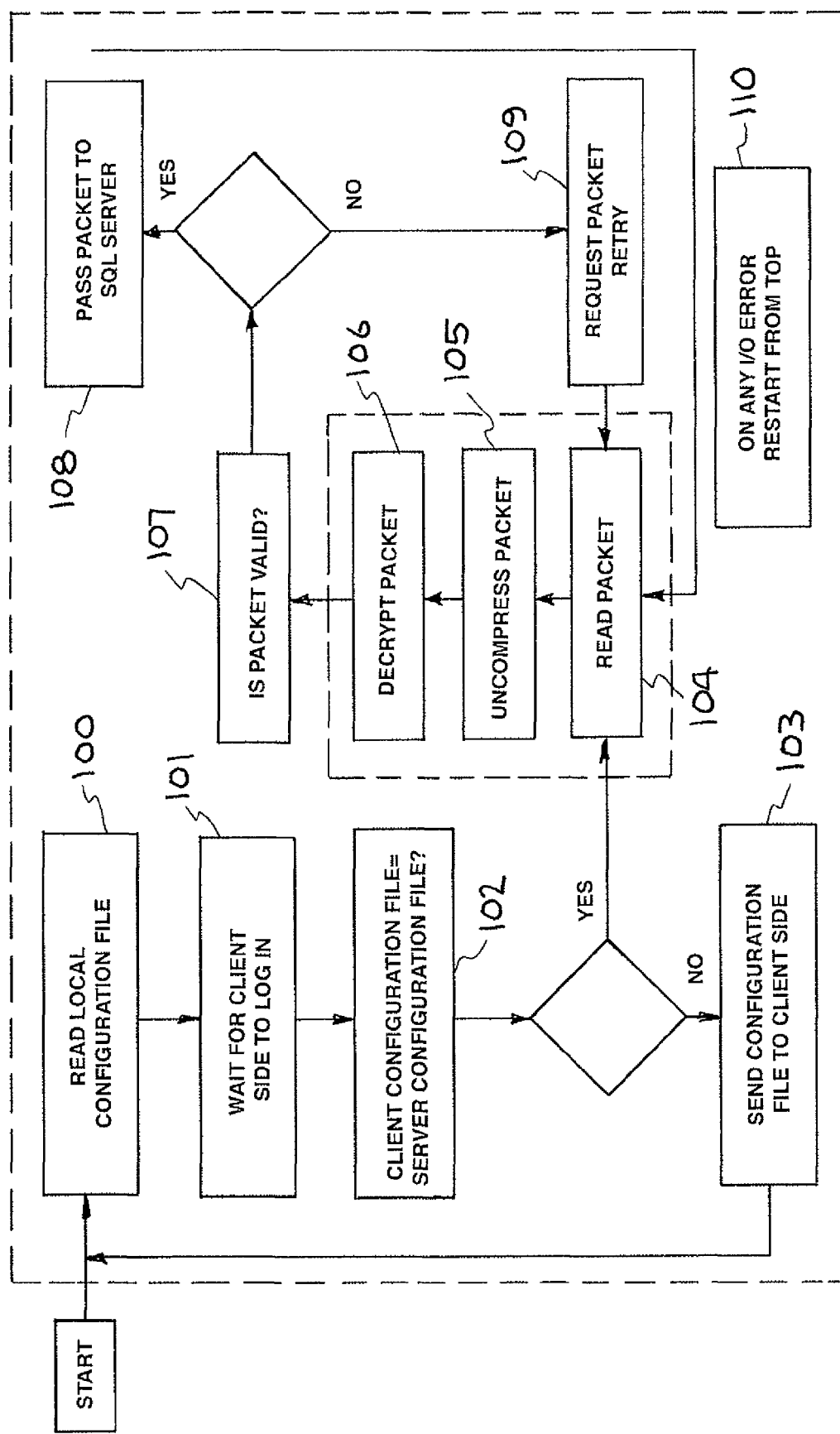
FIG. 9 is a server side software flowchart.

The server side software shown in FIG. 9 uploads the local server configuration file into memory, step 100, and waits for the client side to log in, step 101. Upon establishing a successful link (once the handshaking protocols are established from a valid client configuration file), the client configuration file is uploaded and compared to the server configuration file, step 102. If they differ, the server configuration file is downloaded to the client side, step 103, and the software returns to step 100. If they are the same, the packets from the client are read, step 104. Each packet then passes through an Uncompressing Engine, step 105, a Decryption Engine, step 106, and is checked for data integrity, step 107. Valid packets are passed to the SQL server for formatting and storing, step 108. If a packet is not valid in step 107, a packet retry request is made, step 109, and the software returns to step 104. On any I/O error, the server side software restarts from the top, step 110.

Secure Website

With an emphasis on cyber-security, a secure website was created to manage access to the data and trial run information. Three levels of access were provided, all SSL and password protected. The two more restricted levels, for project engineers and site administrators, were protected by RSA key one time passwords (OTP).

The top most level of access was designed to provide real time, up to the minute updates on the status of the systems. The only sensor data not made available was the radiation data. Additionally, the resolution of the geo-location was restricted and did not provide street level information.

There were four fields of interest in the website.

Geo-location: The top field provided an updated status as to the current location of the system as well as a history track of the system's travel path. On the left field a global map gave an overview. This field was interactive, and by moving the pointing device over the global view, a zoomed in localized view was displayed in the left field. The middle field provided the last known position of the system.

Single Point Measurements: Below the geo-location field, a series of buttons permitted display of the single point measurements (temperature, humidity, voltage, etc.) on a time series graph. Borrowing from network statistic graphs, the time scale was in days since start of measurement.

Event Driven Sensors: Below the single point measurement field was the display for the event driven sensors. Tables with time stamped entries for logged events were generated for every sensor. Selection of a particular line in one of the tables displayed the 2 sec time series corresponding to that particular event.

Blog: The bottom field was designed as a running commentary from the project team to provide analysis and insight into different aspects of the trial runs.

Event Driven Sensors Data Analysis

Analysis of time series data is essential for monitoring and interpretation of cargo container activity. Without appropriate sensor fusion, the probability of a false positive or negative becomes intolerable. For the purpose of three trial runs, time series sensors were event driven. All the sensors were constantly monitored and if a predetermined threshold was crossed for any of the sensors, a time series was captured for every event driven sensor. The optical and UWB intrusion sensors were respectively set to a detection characteristic carefully determined through a consideration of typical ambient light and radar cross section of a human target. The accelerometers were set to a very low activation threshold so that even minimal vibration from roadway transportation would collect data. The intent was to have an ample sampling of background conditions throughout the trips. A careful balance was maintained so that the sampled data would not overflow the hard disk capacities. The capability existed to modify the thresholds on the container systems from the remote server.

For time series recorded data in general, certain restrictions are imposed by the length of the data window being analyzed and by the sampling rate used to digitize continuous data. Data recorded in these trials was further discretized as it was event driven. The logging duration varied by sensor type. In the case of the accelerometer data, three orthogonal or so called tri-axis sensors recorded a time series whose duration was 2000 samples at a sample rate of 5.5K samples per second. For the optical and UWB sensors, a second of data was collected for each sensor at a sample rate of 1K samples per second.

The philosophy employed was to record data for the first trial run and after the end of the run, develop algorithms that provided discrimination between an intrusion event and an environmental event. For example, due to high shock loading and vibration of the container walls during placement of the container on a ship, a cursorily look at UWB radar data might be interpreted as comparable to that of an intrusion event. By incorporating the knowledge given by the high G forces generated and recorded by the accelerometer data, the event can be classified as environmental and not an intrusion. These algorithms were then incorporated into the subsequent two trial runs and run blindly on the data as it was recorded as opposed to post processing at the end. This provided an indication as to the reliability and robustness of the algorithms as well as the accuracy of the environmental modeling.

In this examplary system it is important to remember that an event is not equivalent to an alarm. Any given recording of an event could very well have been triggered by a non-alarm condition such as a scheduled process (for example loading and unloading) or environmental action (truck/train vibration, ship swaying). An alarm only occurs when coordinated information from one or many sensors indicate an abnormality based on a sensor fusion data analysis.

The challenge to using an UWB sensor as an intrusion alarm in a cargo container is discrimination between intrusion events and non-alarm events such as container vibration, shifting cargo in the container, and extraneous RF interference. As such, much thought was devoted into autonomous discrimination of events purely from the radar sense prior to sensor fusion. Simple raw detection without any intelligent real-time or post-processing was not enough by itself.

The ability to identify targets by ultrawideband radar based on emitted impulse and step frequency wave systems has been investigated previously by many independent researchers. Various known techniques, including Pseudo Wigner Distribution (PWD) and Choi-Williams Distribution (CWD), Fast Wavelet Transform, Extinction Pulse Discrimination Scheme, Bispectral Analysis, and Kernel Analysis, can be used in the pre-processing step for the UWB intrusion sensor.

False Alarm Discrimination

Figure 10A:
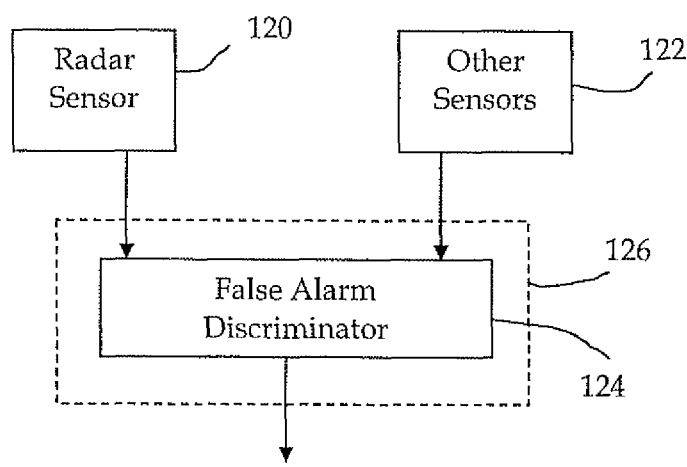
FIG. 10A is a block diagram of an embodiment of the present apparatus for false alarm discrimination.

Discrimination against false alarms is an important aspect of the invention. A combination of hardware and software are utilized to accomplish this goal. As shown in FIG. 10A, outputs from UWB radar sensor 120 and from other sensors 122 are input into a false alarm discriminator 124 which forms a part of control system 126. False alarm discriminator 124 may not be a separate identifiable hardware component, but may be a function performed by the hardware and software of control system (e.g., laptop computer) 126. The other sensors 122 will typically include accelerometers, and may include other intrusion sensors, e.g., optical and magnetic. False alarm discriminator 124 will analyze the various inputs and output a signal indicating an intrusion if it determines that the signals meet criteria that the signals can with a high degree of probability only be caused by a true intrusion and not by another event. The better the rejection criteria, the lower the chances of false alarms. In an alternate embodiment of the invention, the system has only an UWB sensor and no other motion sensors. The control system contains software that implements a false alarm discrimination algorithm based only on the UWB signals.

Figure 10B:
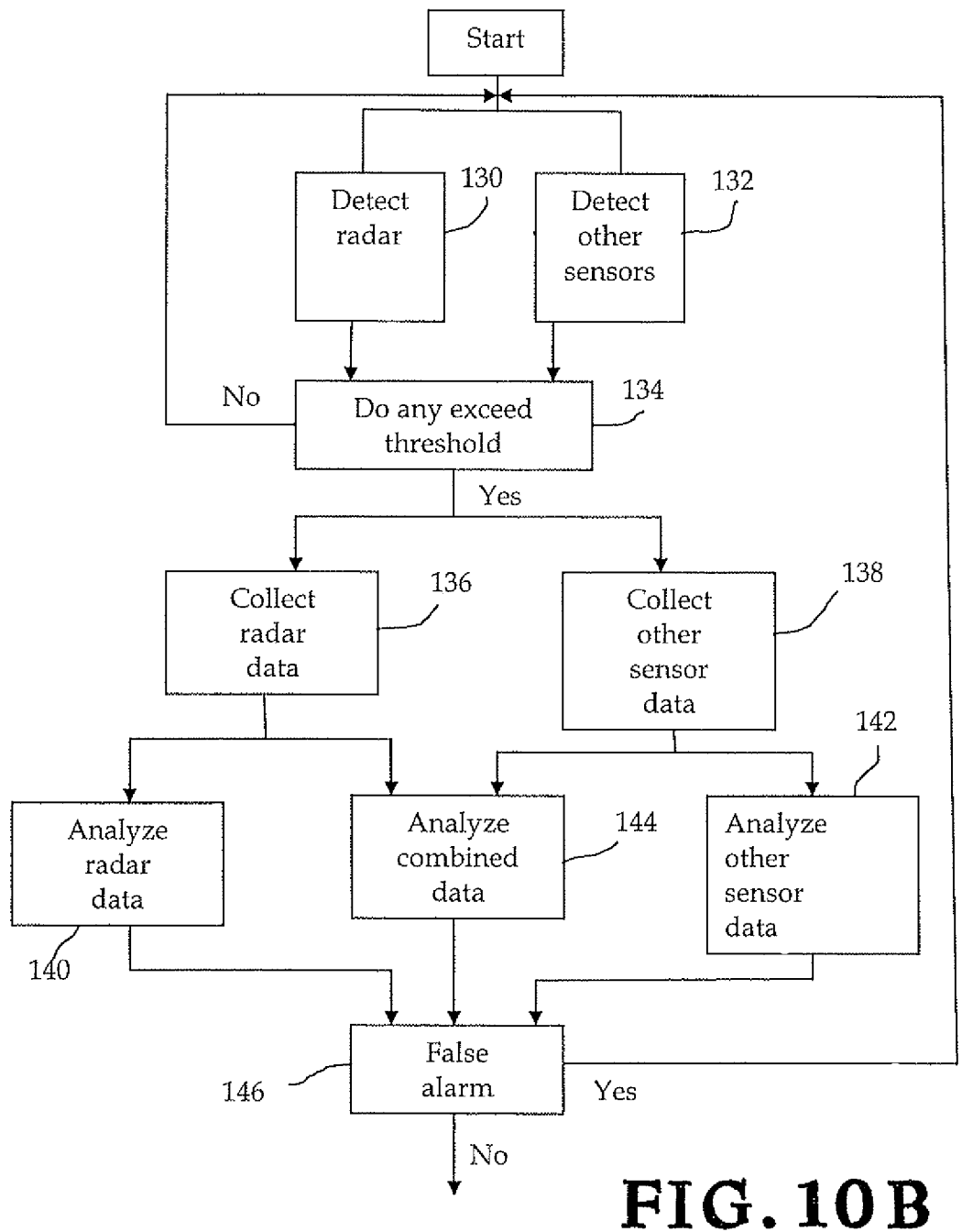
FIG. 10B is a flowchart of an embodiment of the present method for false alarm discrimination.

FIG. 10B is a flowchart for a method of discriminating against false alarms that may be implemented in the system of FIG. 10A. At the start, signals from the radar sensor and from the other sensors are continuously monitored, steps 130, 132. The system confidence in a detection from these signals is compared to triggering threshold values, step 134. If no signals exceed the detection confidence threshold, the system returns to the start. If any signal exceeds its threshold, radar data and data from all the other sensors is collected and logged for additional processing steps, steps 136, 138. Once collected the radar data is further analyzed, step 140; the other sensor data is analyzed, step 142; and the combined radar and other sensor data is analyzed, step 144. From these data analyses, and comparison to predetermined criteria, a determination is made as to whether the detection data indicates a false alarm, step 146, or if it is the result of a valid intrusion detection. If the signal processing system determines that it was a non-intrusion related event, the system notes that and returns to the start. If the system finds that it was a valid intrusion detection alarm, then an output indicating an intrusion is given and noted. The challenge to implement and fuse different aspects of the aforementioned techniques stems from the design of the intrusion sensor as an ultrawideband, ultra-low power system to provide long-life (>2 year) intrusion detection, with very limited capability for capture and analysis of the reflected signal.

The system was deployed with extensive data logging and management hardware and software designed to collect, log, and ex-filtrate data from the sensors 24/7 during the entire voyage of the container. The system also included satellite communication technology to permit exfiltration of selected data throughout the trip. Additionally, several banks of batteries were deployed to support the data logging systems and to ensure ample and uninterrupted power for redundant systems and add-on capability.

The addition of this data logging and ex-filtration hardware not only permits post analysis of the sensor data taken during "alarms" or "periods of interest." It also logs and makes background sensor data available from any point during the container's voyage, allowing readings from the entire trip to be viewed and analyzed to assist with the design of future systems and to predict the anticipated alarm background threshold levels.

The invention thus provides an apparatus and method for intrusion detection in a container using UWB radar. The invention also provides apparatus and method for false alarm discrimination with the UWB intrusion detection. The invention also provides near real time communications with the UWB intrusion detection and host of other cargo monitoring systems. The invention further provides a secure container having such an UWB intrusion detection system mounted therein. U.S. Provisional Application No. 61/106,102 is incorporated herein by reference. The invention thus provides improved safety and security of cargo containers during transport by ship, truck or train, and while waiting at docks, depots and stations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

The invention claimed is:

1. An intrusion detection apparatus for detecting intrusion into a cargo shipping container, comprising:

an ultrawideband (UWB) radar intrusion sensor having a fixed range gate;
at least one other motion or intrusion sensor; and
a control system connected to the UWB radar intrusion sensor and to the at least one other motion or intrusion sensor for determining therefrom the occurrence of an intrusion into a cargo shipping container in which the intrusion detection apparatus is mounted, wherein said fixed range gate is substantially equal to the distance from the UWB radar intrusion sensor to the farthest point of the container from the UWB radar intrusion detector, whereby because of multipath reflections any point in the container is at or within the fixed range gate and an intrusion at any point will be detected.

2. The apparatus of claim 1, wherein the UWB radar intrusion sensor is a homodyne radar sensor.

3. The apparatus of claim 1, wherein the at least one other motion or intrusion sensor is selected from an accelerometer, an optical intrusion sensory and a magnetic intrusion sensor.

4. The apparatus of claim 1, wherein the control system comprises a false alarm discriminator which determines from signals from the UWB radar intrusion sensor and the at least one other motion or intrusion sensor whether a signal from the UWB radar intrusion sensor represents the occurrence of an intrusion into the container or a false alarm.

5. The apparatus of claim 1, mounted in a cargo shipping container.

6. A cargo shipping container sensing and tracking system adapted for mounting in a cargo shipping container, comprising:
a plurality of sensors, one sensor comprising an ultrawideband (UWB) radar intrusion detector having a fixed range gate;
at least one control module, the plurality of sensors being connected thereto;
a central control unit connected to the at least one control module for determining from the plurality of sensors the occurrence of an intrusion into a container; and
a power module connected to the at least one control module, wherein said fixed range gate is substantially equal to the distance from the UWB radar intrusion sensor to the farthest point of the container from the UWB radar intrusion detector, whereby because of multi path reflections any point in the container is at or within the fixed range gate and an intrusion at any point will be detected.

7. The system of claim 6, further comprising a communication link connected to the central control system and the at least one control module.

8. The system of claim 6, wherein the plurality of sensors further comprise a three-axis accelerometer.

9. The system of system of claim 8, wherein the plurality of sensors further comprise an optical intrusion sensor and a magnetic intrusion sensor.

10. The system of claim 6, wherein the UWB radar intrusion detector is a homodyne micro-impulse radar (MIR) sensor.

11. The system of claim 6, wherein one of the plurality of sensors comprises a radiation detector.

12. The system of claim 6, wherein the central control system includes a false alarm discriminator.

13. A method for detecting intrusion into a cargo shipping container, comprising:
placing an ultrawideband (UWB) radar intrusion detector having a fixed range gate inside a cargo shipping container, the fixed range gate of the UWB radar intrusion detector being substantially equal to the distance from the UWB radar intrusion detector to the farthest point of the container from the UWB radar intrusion detector; and
operating the UWB radar intrusion detector;
whereby because of multipath reflections any point on the container is at or within the fixed range gate and an intrusion at any point is detected.

14. The method of claim 13, further comprising placing additional sensors inside the cargo shipping container.

15. The method of claim 14, further comprising discriminating against false alarms by analyzing data from the UWB radar intrusion detector and from the additional sensors.

16. The method of claim 10, further comprising communicating information about the occurrence of an intrusion to a remote location outside the container.

17. An instrumented container for shipping cargo, comprising:
a cargo shipping container made of or coated with metal or other radar reflective material; and
an ultrawideband (UWB) radar intrusion detector having a fixed range gate inside the cargo shipping container, the fixed range gate of the UWB radar intrusion detector being substantially equal to the distance from the UWB radar intrusion detector to the farthest point of the container from the UWB radar intrusion detector, whereby because of multipath reflections, any point on the container is at or within the fixed range gate and an intrusion at any point is detected.

18. The instrumented container of claim 17, wherein the UWB radar intrusion detector is a homodyne micro-impulse radar (MIR) sensor.

19. The instrumented container of claim 17, further comprising accelerometers mounted in the shipping container.

20. The instrumented container of claim 19, further comprising a control system connected to the UWB radar intrusion detector and to the accelerometers.

21. The instrumented container of claim 20, wherein the control system comprises a false alarm discriminator.

22. The instrumented container of claim 17, further comprising a radiation detector mounted in the container.

23. The instrumented container of claim 20, further comprising a communication link connected to the control system.

24. An intrusion detection apparatus for detecting intrusion into a cargo shipping container, comprising:
an ultrawideband (UWB) radar intrusion sensor having a fixed range gate; and
a control system connected to the UWB radar intrusion sensor to perform signal processing to discriminate against false alarm occurrences, wherein said fixed range gate is substantially equal to the distance from the UWB radar intrusion sensor to the farthest point of the container from the UWB radar intrusion sensor, whereby because of multipath reflections any point on the container is at or within the fixed range gate and an intrusion at any point is detected.

25. The apparatus of claim 24 further comprising one or more discrimination sensors, selected from gross motion sensors, gyros, and accelerometers to assist with discrimination of shipping container movement from actual container intrusion.

26. An apparatus, comprising:
a container; and
an intrusion detection system located within said container, said system comprising an ultrawideband (UWB) radar transmitter which is configured with a fixed range gate that is substantially equal to the distance front said transmitter to the farthest point of within said container, whereby because of multipath reflections any point on the container is at or within the fixed range gate and an intrusion at any point is detected.

27. The apparatus of claim 26, wherein said system further comprises at least one discrimination sensor, selected from the group consisting of a gross motion sensor, a gyro and an accelerometer, wherein said discrimination sensor is configured to assist with discrimination of container movement from container intrusion.

* * * * *